US012782714B2

(12) United States Patent
Wu et al.

(10) Patent No.: US 12,782,714 B2
(45) Date of Patent: Nov. 3, 2026

(54) OPTICAL MODULE

(71) Applicant: Actutek Corporation, Taoyuan City (TW)

(72) Inventors: Ya-Hsiu Wu, Taoyuan City (TW); Yi-Ho Chen, Taoyuan City (TW); Chih-Wen Chiang, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 283 days.

(21) Appl. No.: 18/594,682

(22) Filed: Mar. 4, 2024

(65) Prior Publication Data

US 2024/0295745 A1 Sep. 5, 2024

Related U.S. Application Data

(60) Provisional application No. 63/449,410, filed on Mar. 2, 2023.

(51) Int. Cl.

*G02B 26/08* (2006.01)
*G02B 7/18* (2021.01)
*G03B 5/00* (2021.01)
*G03B 30/00* (2021.01)

(52) U.S. Cl.

CPC ....... *G02B 26/0883* (2013.01); *G02B 7/1805* (2013.01); *G03B 5/00* (2013.01); *G03B 30/00* (2021.01); *G03B 2205/003* (2013.01)

(58) Field of Classification Search

CPC ...................................................... G03B 13/36
See application file for complete search history.

(56) References Cited

U.S. PATENT DOCUMENTS

2013/0201559 A1* 8/2013 Minamisawa ........... G03B 5/02 359/557
2021/0396946 A1* 12/2021 Hu .......................... G02B 7/08

FOREIGN PATENT DOCUMENTS

CN 114721119 A 7/2022

OTHER PUBLICATIONS

Office Action issued in corresponding CN application No. 202420400925.4 dated Aug. 29, 2024 (1 page).

* cited by examiner

*Primary Examiner* — Edmond C Lau
(74) *Attorney, Agent, or Firm* — MUNCY, GEISSLER, OLDS & LOWE, P.C.

(57) ABSTRACT

An optical module is disclosed. The optical module includes a first fixed part, a first movable part, and a first driving assembly. The first fixed part includes a first bottom. The first movable part is connected to a first optical element. The first driving assembly drives the first movable part to move relative to the first fixed part.

18 Claims, 12 Drawing Sheets

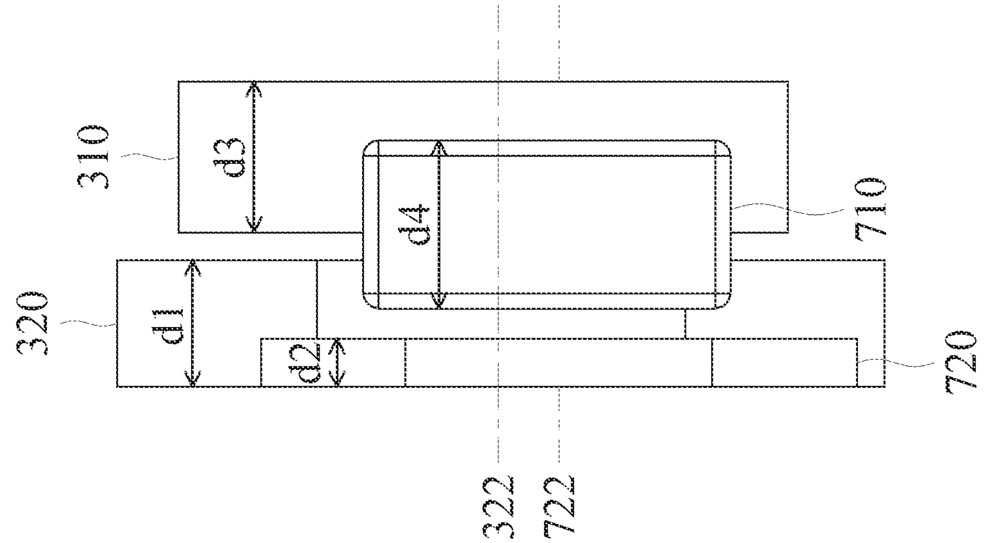
FIG. 11
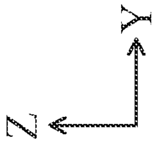

OPTICAL MODULE

CROSS REFERENCE TO RELATED APPLICATIONS

This application claims priority of U.S. Provisional Patent Application No. 63/449,410, filed on Mar. 2, 2023, the entirety of which is incorporated by reference herein.

BACKGROUND OF THE INVENTION

Field of the Invention

The present invention relates to an optical module, and, in particular, to an optical module with a first driving component and a second driving component. The first driving component drives a first movable part, and the second driving component drives a second movable part.

Description of the Related Art

With the development of science and technology, many electronic devices (such as notebook computers, smartphones, and digital cameras) now have the function of taking photos and recording videos. The use of these electronic devices is becoming more and more common. In addition to convenient and thinner designs, it is also necessary to develop more stable and better optical quality to provide users with more choice.

The aforementioned electronic devices with camera and video-recording functions usually include one or more lenses to achieve focusing, zooming and Optical Image Stabilization (OIS). Therefore, the optical module usually includes a plurality of driving components to drive the movement of these optical elements. However, at least one of the conventional driving components is usually arranged in the direction in which the light enters and/or leaves the optical element driving mechanism, resulting in an excessively large distance between the overall center of mass and the center of rotation (for example, a fulcrum), causing problems of tilting or deflection. In view of this, how to precisely adjust the position of the optical element to avoid tilting and deflection has become an important issue.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an optical element is provided. The optical module includes a first fixed part, a first movable part, and a first driving assembly, the first fixed part includes a first bottom, the first movable part is for connecting a first optical element, the first driving assembly is for driving the first movable part to move relative to the first fixed part.

In some embodiments, when viewed along a first optical axis of the first optical element, the first fixed part further includes a first side and a second side, and the first optical element is located between the first side and the second side. When viewed along the first optical axis, the first fixed part has a polygonal structure. When viewed along the first optical axis, the first side and the second side are parallel to each other. When viewed along the first optical axis, the first driving assembly is located on the first side.

In some embodiments, the first driving assembly includes a first magnetic element and a first coil. When viewed along the first optical axis, there is no active driving source for driving the first movable part on the second side. When viewed along the first optical axis, the first fixed part further includes a third side that is not parallel to the first side. When viewed along the first optical axis, the first side is shorter than the third side.

In some embodiments, the optical module further includes a second fixed part, a second movable part, and a second driving assembly, the second fixed part includes a second bottom, the second movable part is for connecting a second optical element, the second driving assembly is for driving the second movable part to move relative to the second fixed part.

In some embodiments, the second driving assembly includes a second magnetic element, a second coil, a third magnetic element, and a third coil. When viewed along the first optical axis, the second magnetic element and the second coil are located on the first side. The third magnetic element and the third coil are located on the second side.

In some embodiments, the first fixed part and the second fixed part are fixedly connected to each other. The first bottom and the second bottom have an integrally formed structure. When viewed along the first optical axis, the second optical element is located between the second magnetic element and the third magnetic element. When viewed along the first optical axis, the first optical axis is located between the second magnetic element and the third magnetic element.

In some embodiments, the maximum dimension of the first coil on a first winding axis is different from the maximum dimension of the second coil on a second winding axis. The maximum dimension of the first magnetic element on the first winding axis is different from the maximum dimension of the second magnetic element on the second winding axis. The ratio of the maximum dimension of the first magnetic element on the first winding axis to the maximum dimension of the first coil on the first winding axis is different from the ratio of the maximum dimension of the second magnetic element on the second winding axis to the maximum dimension of the second coil on the second winding axis.

In some embodiments, the maximum dimension of the first coil on a first winding axis is greater than the maximum dimension of the second coil on a second winding axis. The maximum dimension of the first magnetic element on the first winding axis is smaller than the maximum dimension of the second magnetic element on the second winding axis. The ratio of the maximum dimension of the first magnetic element on the first winding axis to the maximum dimension of the first coil on the first winding axis is smaller than the ratio of the maximum dimension of the second magnetic element on the second winding axis to the maximum dimension of the second coil on the second winding axis.

In some embodiments, the first fixed part further includes a circuit board and a housing, wherein the circuit board is disposed between the first bottom, the second bottom and the housing. The circuit board has a first connection part and a second connection part, the first connection part is located on the first side, the second connection part is located on the second side, the first connection part and the second connection part extend out of the housing.

In some embodiments, the first bottom further includes recesses located on the first side, and the first coil is welded to the circuit board at the recesses.

In some embodiments, the first movable part further includes a stabilizing assembly for applying a stabilizing force to the first movable part such that the first movable part bears against the first fixed part. When viewed along a first axis, the stabilizing force deviates from the first optical axis. The first axis is perpendicular to the first optical axis. When viewed along the first optical axis, the first axis is parallel to the first side. The direction of the stabilizing force is parallel to the first axis. When viewed along the first axis, the stabilizing force deviates from a central axis of the first fixed part. When viewed along the first axis, the central axis is parallel to the first optical axis, and the central axis passes through the center of the first fixed part.

In some embodiments, the stabilizing assembly includes a magnetically permeable element and a stabilizing magnetic element, the magnetically permeable element corresponds to the first magnetic element, the stabilizing magnetic element corresponds to the magnetically permeable element. The first magnetic element is located between the magnetic permeable element and the first coil.

In some embodiments, when viewed along the first optical axis, the first bottom is located on the third side. The first bottom further includes a first opening corresponding to the first movable part. The first optical element at least partially overlaps the first opening when viewed along the first axis.

In some embodiments, the first fixed part further includes a first structural reinforcement element, and a stray-light-preventing element. The first structural reinforcement element is disposed in the first opening, and has a metal material and a magnetically permeable material. The stray-light-preventing element is disposed on the first bottom. The stray-light-preventing element is disposed at the first opening.

In some embodiments, the first structural reinforcement element corresponds to the stabilizing magnetic element. When viewed along the first axis, the stabilizing magnetic element at least partially overlaps the first structural reinforcement element. The stabilizing magnetic element is movable relative to the first structural reinforcement element.

In some embodiments, when viewed along the first axis, the area of the stray-light-preventing element is different from the area of the first structural reinforcement element.

In some embodiments, when viewed along the first axis, the area of the stray-light-preventing element is smaller than the area of the first structural reinforcement element. When viewed along the first axis, the stray-light-preventing element and the first opening at least partially do not overlap.

In some embodiments, the first fixed part further includes a plurality of stopper elements, including an elastic material. The stopper elements are arranged on the first bottom. The stopper elements at least partially cover the first bottom.

In some embodiments, the elastic material is rubber.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 11 is a front view of the first magnetic element and the first coil of the first driving assembly, and the second magnetic element and the second coil of the second driving assembly of the optical module of FIG. 1, according to certain aspects of the present disclosure.

DETAILED DESCRIPTION OF THE INVENTION

Figure 1:
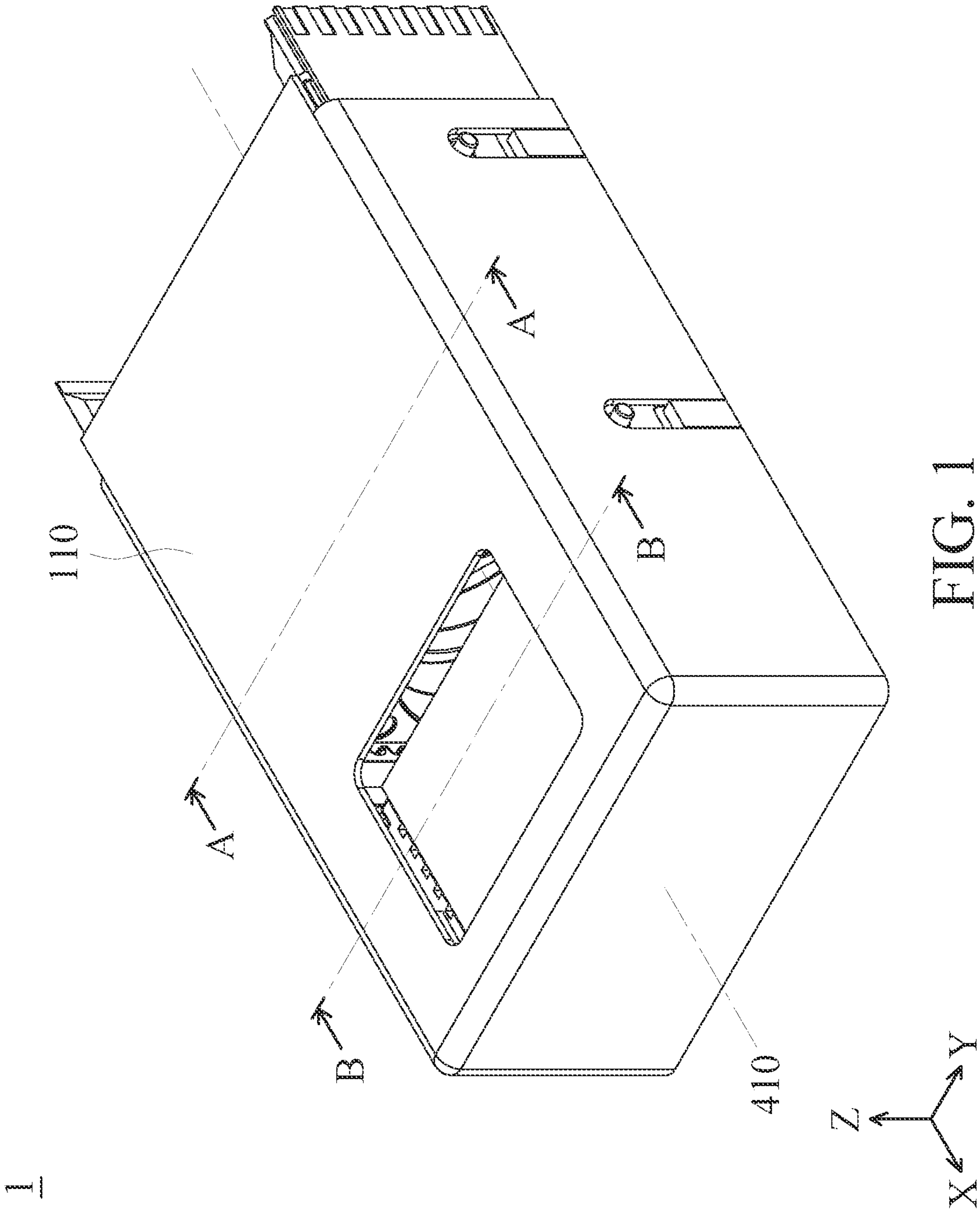
FIG. 1 is a front perspective view of an example optical module, according to certain aspects of the present disclosure.

Various embodiments are described with reference to the attached FIGS., where like reference numerals are used throughout the FIGS. to designate similar or equivalent elements. The FIGS. are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
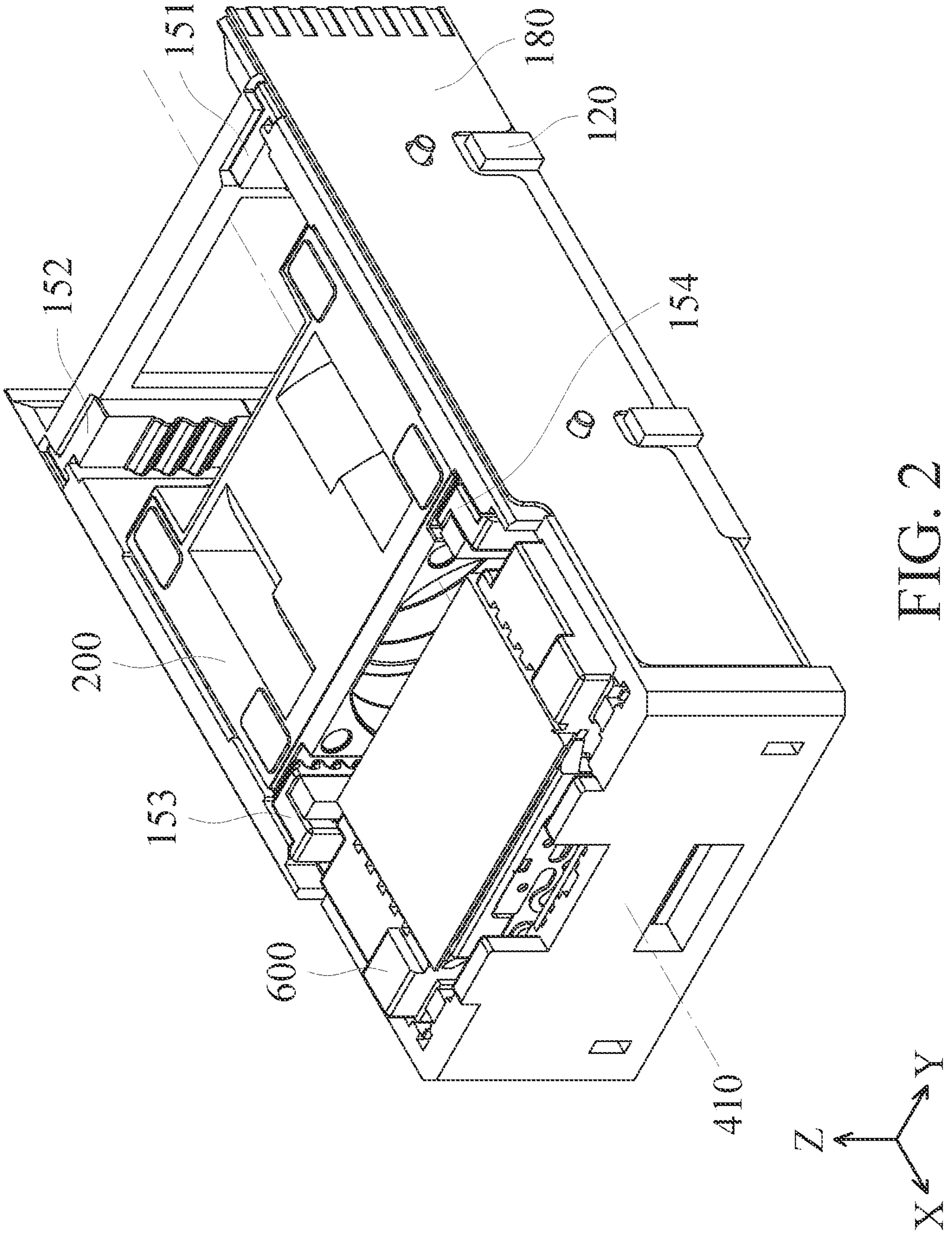
FIG. 2 is a perspective view of the optical module of FIG. 1 without the housing, according to certain aspects of the present disclosure.
Figure 3:
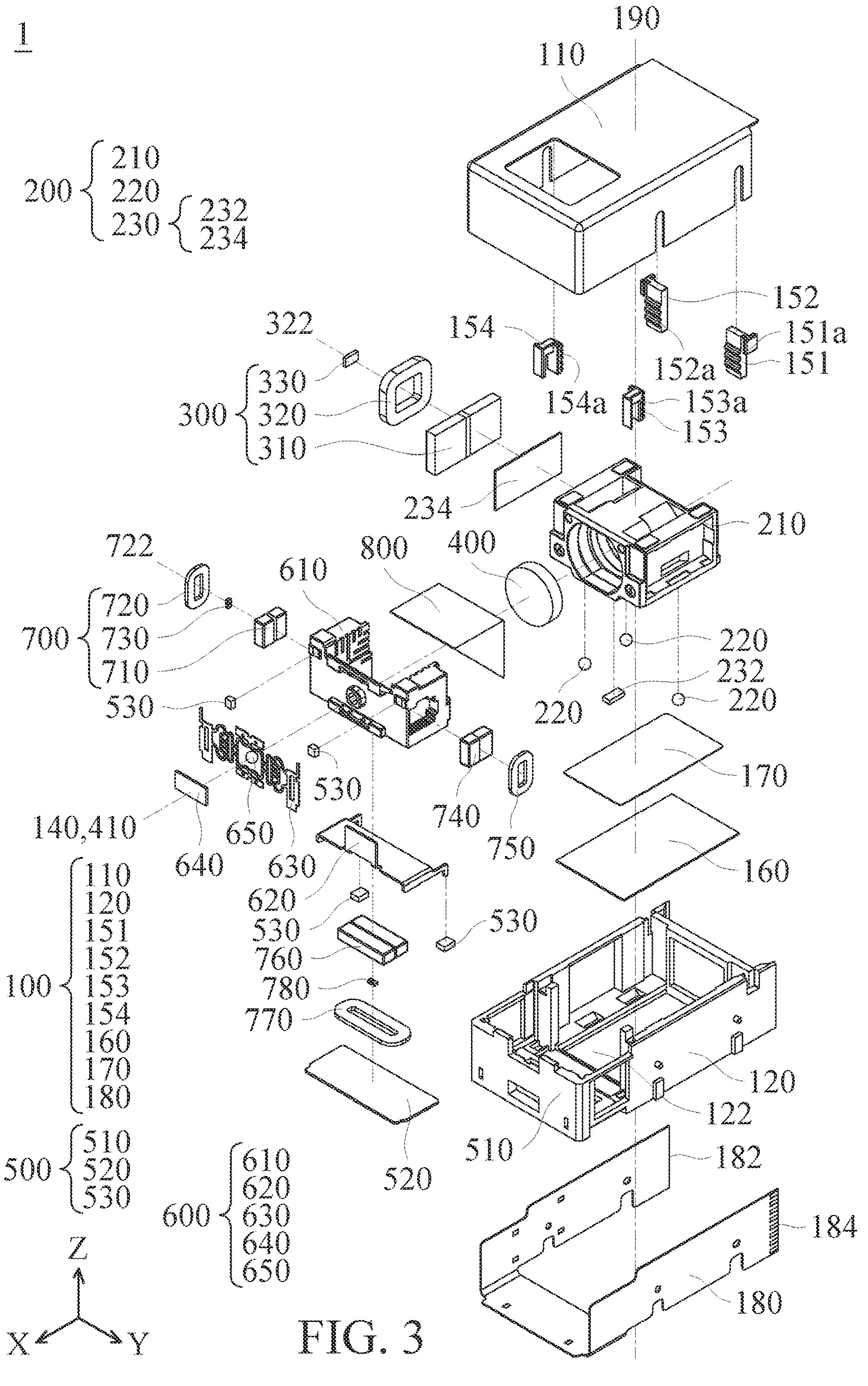
FIG. 3 is an exploded perspective view of the optical module of FIG. 1, according to certain aspects of the present disclosure.

Please refer to FIG. 1 to FIG. 3 together. FIG. 1 is a front perspective view of an example optical module 1, according to certain aspects of the present disclosure. FIG. 2 is a front perspective view of the optical module 1 with the housing removed, according to certain aspects of the present disclosure. FIG. 3 is an exploded perspective view of optical system 1, according to certain aspects of the present disclosure. The optical system 1 includes a first fixed part 100, a first movable part 200, a first driving assembly 300, a first optical element 400, a second fixed part 500, a second movable part 600, a second driving assembly 700, and a second optical element 800. The first optical element 400 has a first optical axis 410.

The first fixed part 100 includes a housing 110, a first bottom 120, four stopper elements 151, 152, 153, 154, a first structural reinforcement element 160, a stray-light-preventing element 170, and a circuit board 180. The first bottom 120 has a first opening 122, and two recesses 124, 125 (see FIG. 12). The first fixed part 100 has a central axis 140.

The housing 110 has a first side 112, a second side 114, and a third side 116 (visible in FIG. 4), and when viewed along the first optical axis 410, the first bottom 120 is located on the third side 116.

The first movable part 200 includes a first carrier 210, three supporting elements 220, and a stabilizing assembly 230. The first movable part 200 is connected to the first optical element 400.

The first driving assembly 300 includes a first magnetic element 310, a first coil 320, and a first sensing element 330. The first driving assembly 300 drives the first movable part 200 to move relative to the first fixed part 100.

Figure 4:
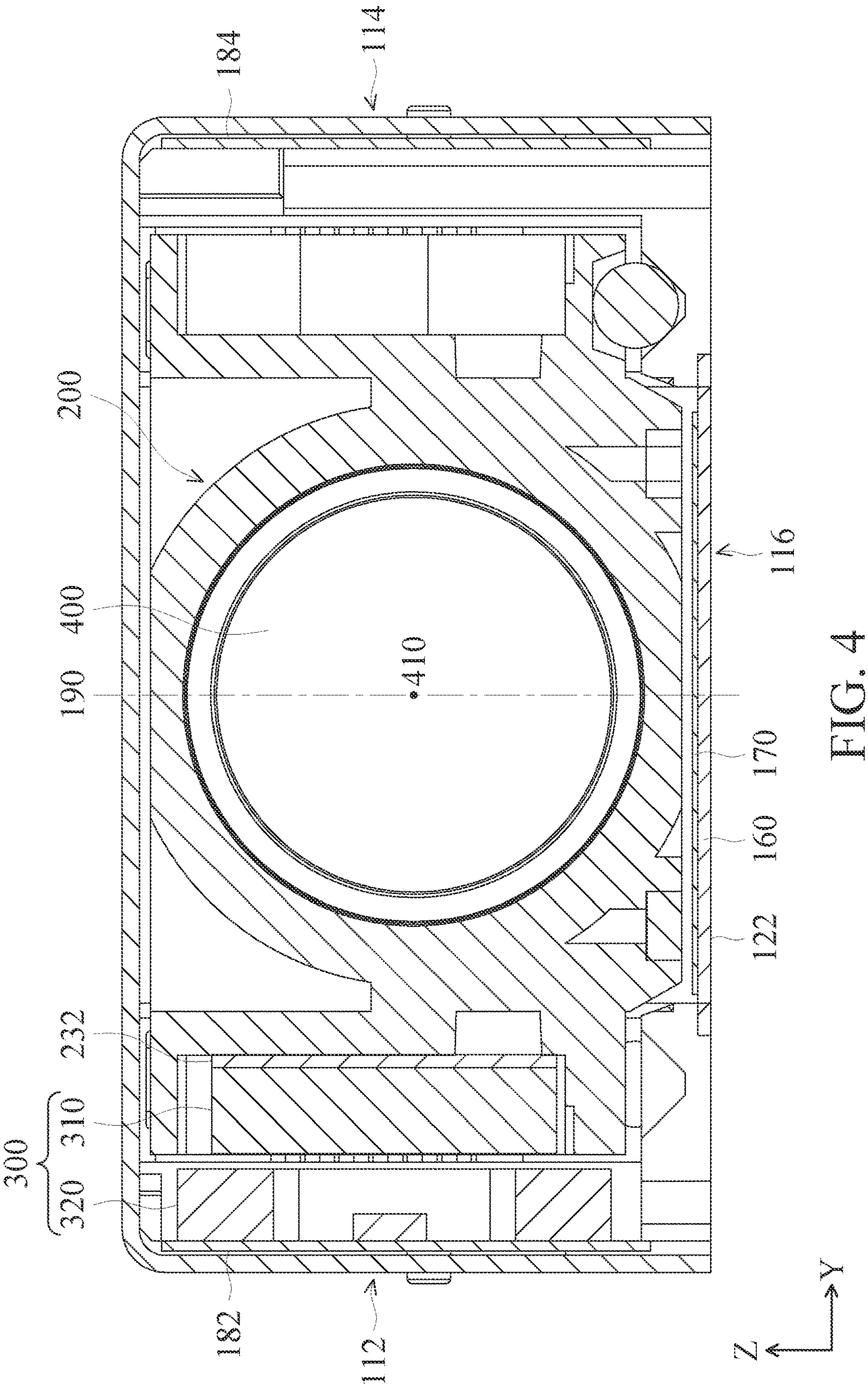
FIG. 4 is a cross-sectional view of the optical module of FIG. 1 along line A-A of FIG. 1, according to certain aspects of the present disclosure.

Please refer to FIG. 4. FIG. 4 is a cross-sectional view of the optical module 1 along the line A-A of FIG. 1, according to certain aspects of the present disclosure. A first axis 190 is perpendicular to the first optical axis 410, and when viewed along the first optical axis 410, the first axis 190 is parallel to the first side 112. When viewed along the first axis 190, a central axis 140 is parallel to the first optical axis 410, and the central axis 140 passes through the center of the first fixed part 100. When viewed along the first optical axis 410, the first optical element 400 is located between the first side 112 and the second side 114. When viewed along the first optical axis 410, the first fixed part 100 has a polygonal structure, the first side 112 and the second side 114 are parallel to each other, and the first driving assembly 300 is located on the first side 112. The third side 116 is not parallel to the first side 112, and the length of the first side 112 is shorter than the length of the third side 116. There is no active driving source on the second side 114 for driving the first movable part 200, that is; there is no any driving source for driving the first movable part 200 such as electromagnetic, moving magnet, or piezoelectric motor. This way, the magnetic interference that may affect the first movable part 200 when it moves may be effectively reduced.

Figure 5:
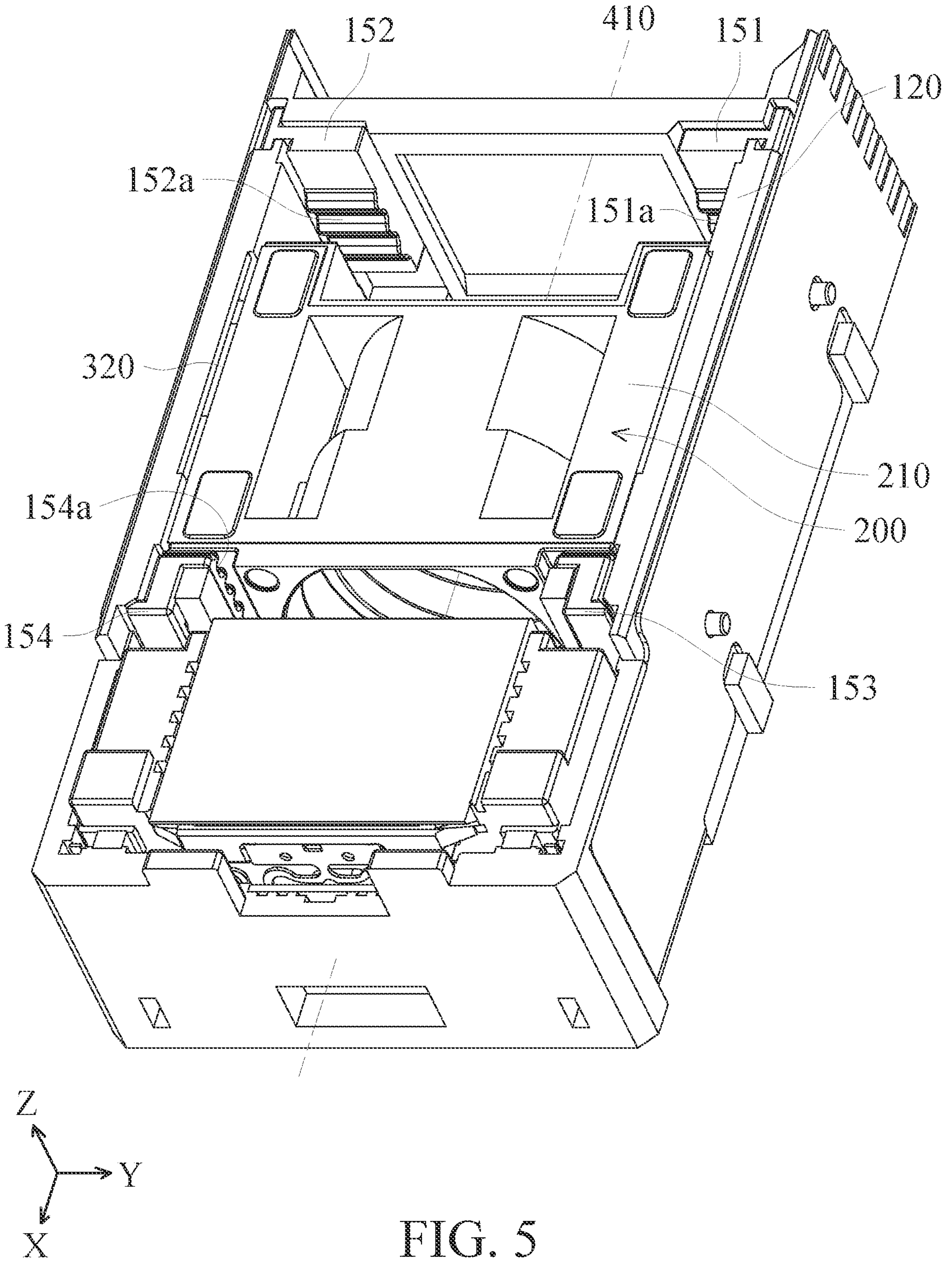
FIG. 5 is a perspective view of the first movable part of the optical module of FIG. 1 in a first position according to certain aspects of the present disclosure, with the housing not shown for illustrative reasons.
Figure 6:
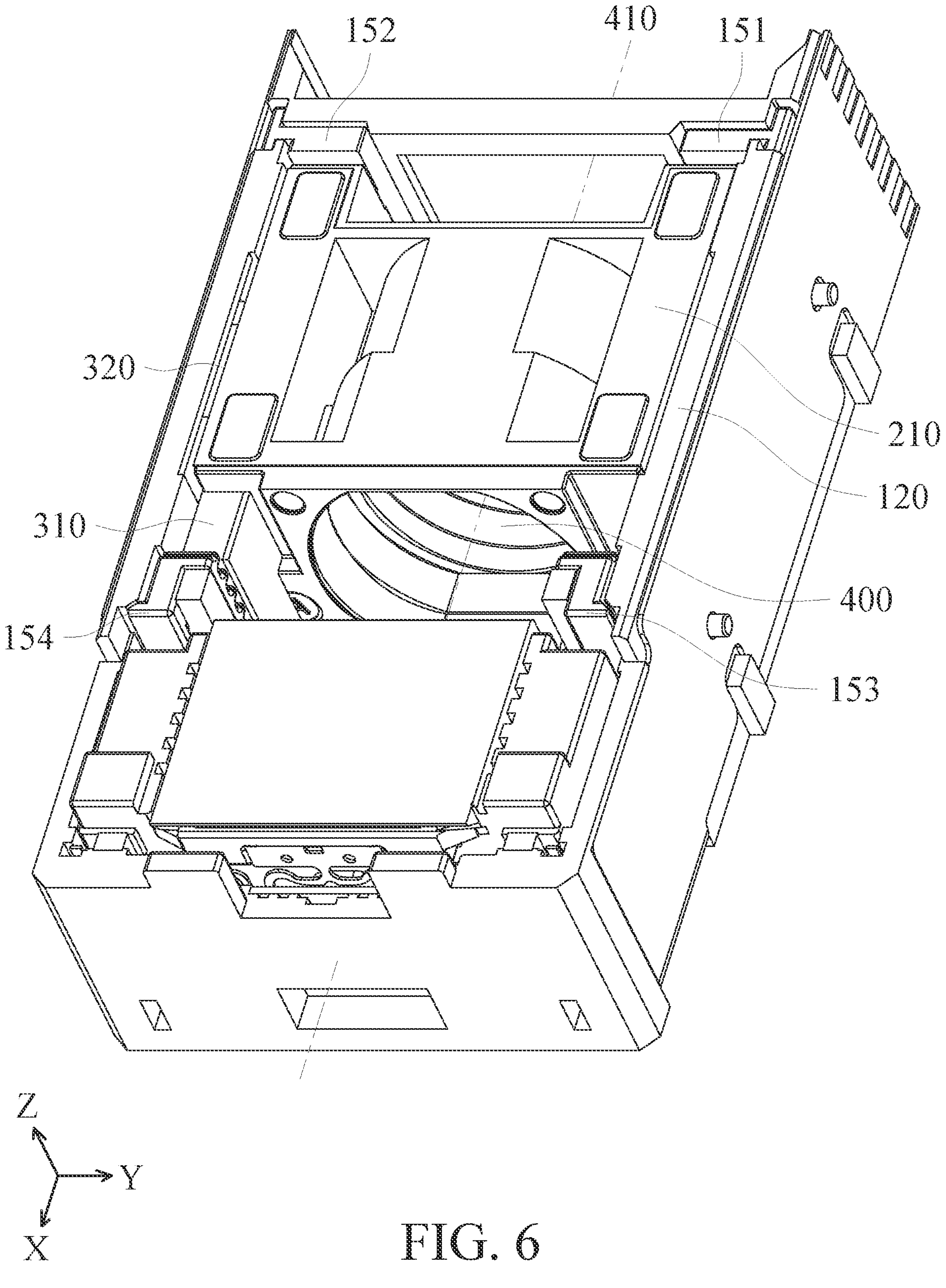
FIG. 6 is a perspective view of the first movable part of the optical module of FIG. 1 in a second position according to certain aspects of the present disclosure, with the housing not shown for illustrative reasons.

Please refer to FIG. 5 and FIG. 6. FIG. 5 is a perspective view of the first movable part 200 in a first position, according to certain aspects of the present disclosure, with the housing 110 not shown for illustrative reasons. FIG. 6 is a perspective view of the first movable part 200 in a second position, according to certain aspects of the present disclosure, with the housing 110 not shown for illustrative reasons. With the electromagnetic driving force generated between the first coil 320 and the first magnetic element 310, the first movable part 200 is driven to move along the direction of the first optical axis 410 between the first position in FIG. 5 and the second position in FIG. 6. The first sensing element 330 (shown in FIG. 3) is disposed at the central part of the first coil 320. The first sensing element 330 may be used to sense the displacement of the first moving part 200 when moving, to achieve more accurate sensing.

Stopper elements 151, 152, 153, and 154 are disposed on the first bottom 120, at least partially cover the first bottom 120, and provide buffering before and after the movement of the first movable part 200. The stopper elements 151, 152, 153, and 154 include an elastic material such as rubber or the like. The stopper elements 151, 152, 153, and 154 have a plurality of recesses 151*a*, 152*a*, 153*a*, and 154*a*. When the first movable part 200 moves until it contacts one of the stopper elements 151, 152, 153, and 154, the recesses 151*a*, 152*a*, 153*a*, 154*a* provide space for deformation for the elastic material. When the first movable part 200 moves to the second position shown in FIG. 6, the stopper element 151 and the stopper element 152 provide buffer between the first carrier 210 and the first bottom 120. When the first movable part 200 moves to the first position shown in FIG. 5, the stopper element 153 and the stopper element 154 provide buffer between the first carrier 210 and the first bottom 120. The stopper elements 151, 152, 153, and 154 may effectively absorb noises that may be caused by impacts while also provide cushioning.

Figure 7:
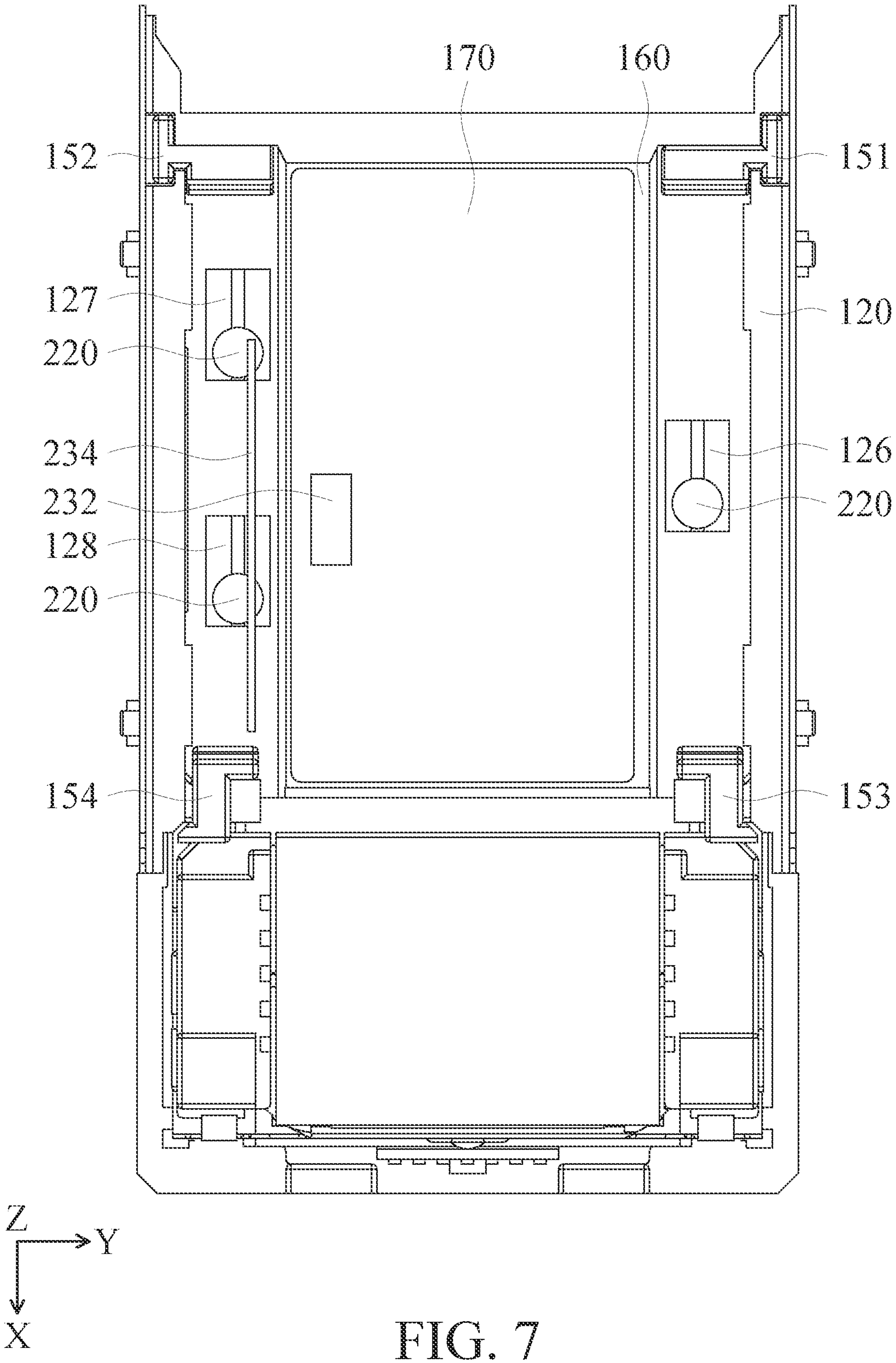
FIG. 7 is a top view of the optical module of FIG. 1 according to certain aspects of the present disclosure, with the housing, the first carrier, and the first driving assembly not shown for illustrative reasons.

Please refer to FIG. 7. FIG. 7 is a top view of the optical module 1, according to some aspects of the present disclosure, with the housing 110, the first carrier 210, and the first driving assembly 300 not shown for illustrative reasons. The supporting element 220 is disposed in the first bottom 120 to support the first carrier 210. The three supporting elements 220 are respectively disposed in a plurality of grooves 126, 127, 128 of the first bottom 120. When the first movable part 200 moves, the three supporting elements 220 move along the grooves 126, 127, 128 respectively, supporting the first carrier 210 and preventing it from overturning.

Figure 8:
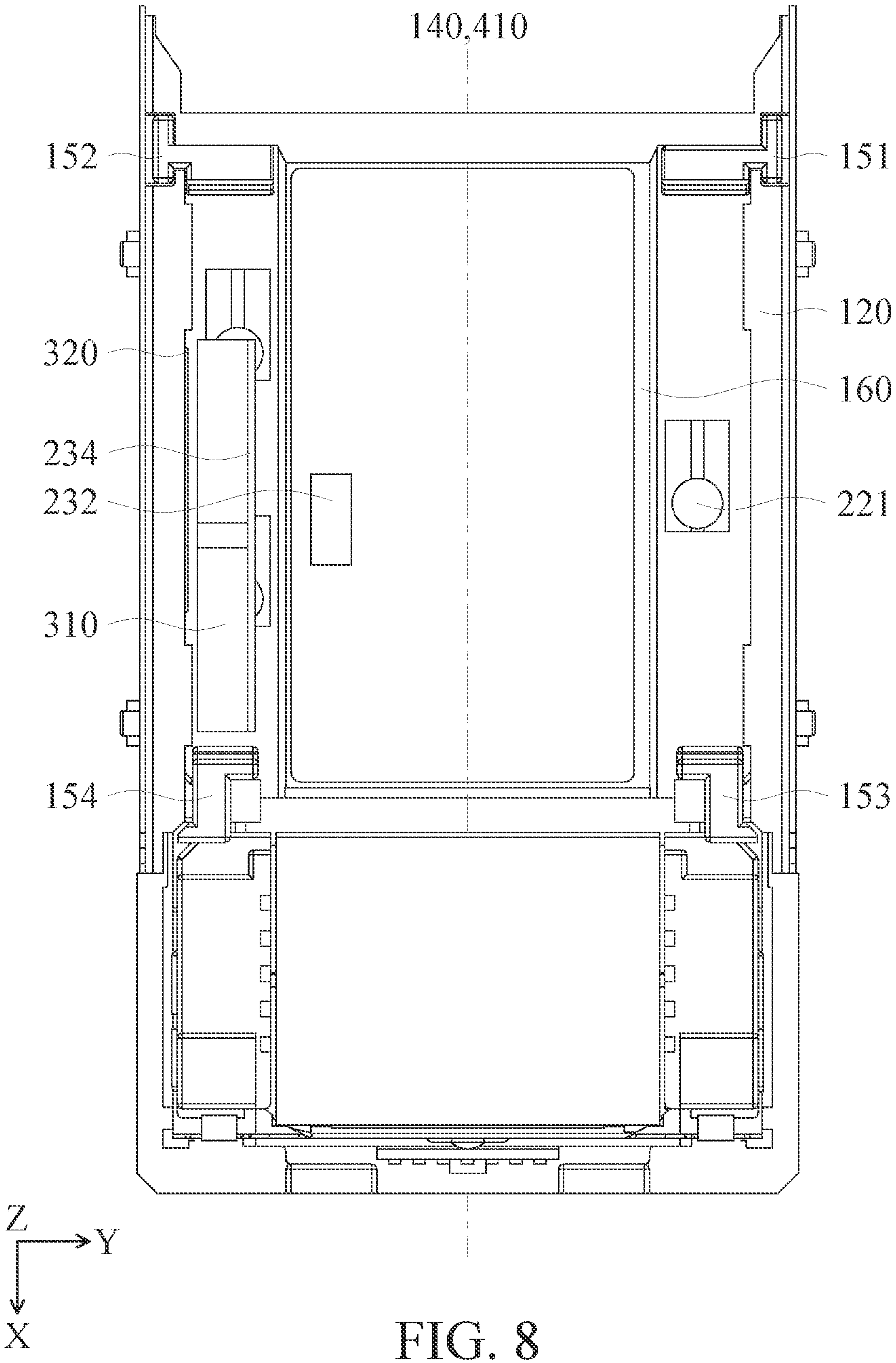
FIG. 8 is a top view of the optical module in FIG. 1 according to certain aspects of the present disclosure, with the housing and the first carrier not shown for illustrative reasons.

Please refer to FIG. 8. FIG. 8 is a top view of the optical module 1, according to certain aspects of the present disclosure, with the housing 110 and the first carrier 210 not shown for illustrative reasons. The stabilizing assembly 230 includes a stabilizing magnetic element 232 and a magnetically permeable element 234, the magnetically permeable element 234 corresponds to the first magnetic element 310 structurally, and the stabilizing magnetic element 232 cooperates with the magnetically permeable element 234. The first magnetic element 310 is located between the magnetic permeable element 234 and the first coil 320. The magnetic attraction force between the stabilizing magnetic element 232 and the magnetically permeable element 234 may apply a stabilizing force to the first movable part 200 so that the first movable part 200 bears against the first fixed part 100 to prevent the first movable part 200 from overturning. The direction of the stabilizing force is parallel to the first axis 190 (can be seen in FIG. 3), parallel to the Z-axis, and perpendicular to the X-Y plane. When viewed along the first axis 190, the stabilizing force deviates from the first optical axis 410 and deviates from the central axis 140 of the first fixed part 100, that is, the stabilizing force does not pass through the center of the first fixed part 100.

Figure 9:
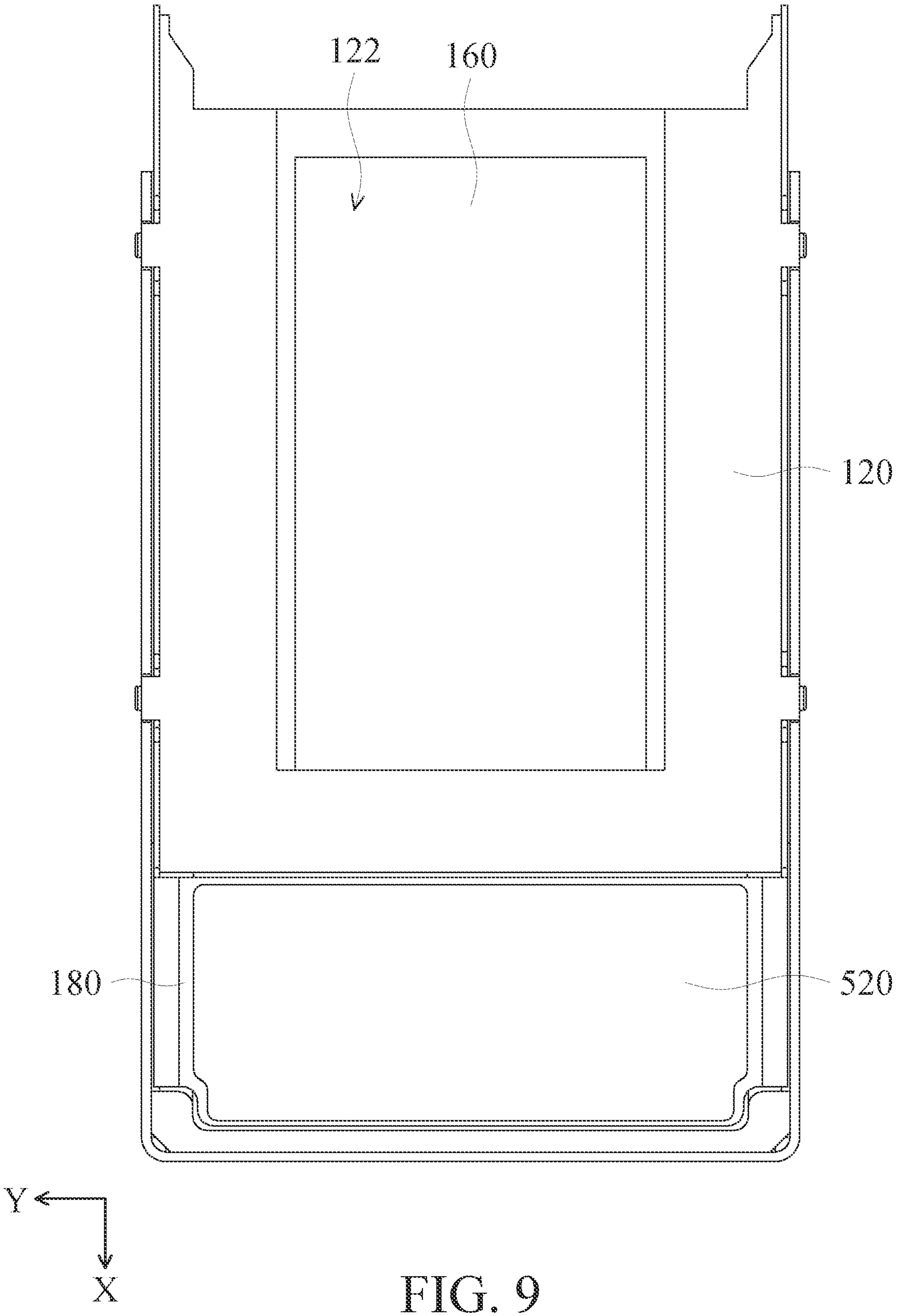
FIG. 9 is a bottom view of the optical module of FIG. 1 according to certain aspects of the present disclosure.

Please refer to FIG. 9 and FIG. 4 together. FIG. 9 is a bottom view of the optical module 1, according to certain aspects of the present disclosure. The first opening 122 of the first bottom 120 corresponds to the first movable part 200. When viewed along the first axis 190, the first optical element 400 at least partially overlaps the first opening 122. The first structural reinforcement element 160 is disposed on the first opening 122. The first structural reinforcement element 160 has a metal material and a magnetically permeable material. The first structural reinforcement element 160 corresponds to the stabilizing magnetic element 232 (FIG. 8), and the magnetic attraction force between the first structural reinforcement element 160 and the stabilizing magnetic element 232 may further stabilize the first movable part 200. The stabilizing magnetic element 232 at least partially overlaps the first structural reinforcement element 160 when viewed along the first axis 190. The stabilizing magnetic element 232 is movable relative to the first structural reinforcement element 160. Please also refer to FIG. 7. The stray-light-preventing element 170 is disposed on the first opening 122 of the first bottom 120. When viewed along the first axis 190, the area of the stray-light-preventing element 170 is different from the area of the first structural reinforcement element 160, and the area of the stray-light-preventing element 170 is smaller than the area of the first structural reinforcement element 160. When viewed along the first axis 190, the stray-light-preventing element 170 does not completely overlap the first opening 122.

Please refer to FIG. 3 again. The second fixed part 500 includes a second bottom 510, a second structural reinforcement element 520, and a plurality of restraining element 530. In some of the embodiments, the restraining element 530 has a plastic material (for example, resin, rubber, etc.). In this embodiment, the restraining element 530 is cured gel, disposed on the second bottom 510, directly contacting the second movable part 600 to suppress the vibration of the second movable part 600 relative to the second fixed part 500, and absorb the impact. The first fixed part 100 and the second fixed part 500 are fixedly connected to each other. The second bottom 510 extends and connects with the first bottom 120. The structures of the first bottom 120 and the second bottom 510 may be formed integrally. The integrally formed (or fixedly connected) structure of the first bottom 120 and the second bottom 510 may save space and achieve miniaturization of the mechanism.

The second movable part 600 includes a second carrier 610, a reinforcing structure 620, an elastic element 630, a magnetic permeable sheet 640, and a second supporting element 650. The second movable part 600 is connected with the second optical element 800. The reinforcing structure 620 is fixedly disposed on the second carrier 610, and the second supporting element 650 is also disposed in the second carrier 610. The elastic element 630 connects the second fixed part 500 and the second movable part 600 by connecting the second bottom 510 of the second fixed part 500 and the second carrier 610 of the second movable part 600. In some embodiments, the elastic element 630 may be a spring or the like, providing a restoring force for the movement of the second movable part 600 relative to the second fixed part 500. The magnetic permeable sheet 640 is disposed between the second supporting element 650 and the second bottom 510.

The second driving assembly 700 includes a second magnetic element 710, a second coil 720, a second sensing element 730, a third magnetic element 740, a third coil 750, a fourth magnetic element 760, a fourth coil 770, and a third sensing element 780. The second driving assembly 700 drives the second movable part 600 to move relative to the second fixed part 500.

Figure 10:
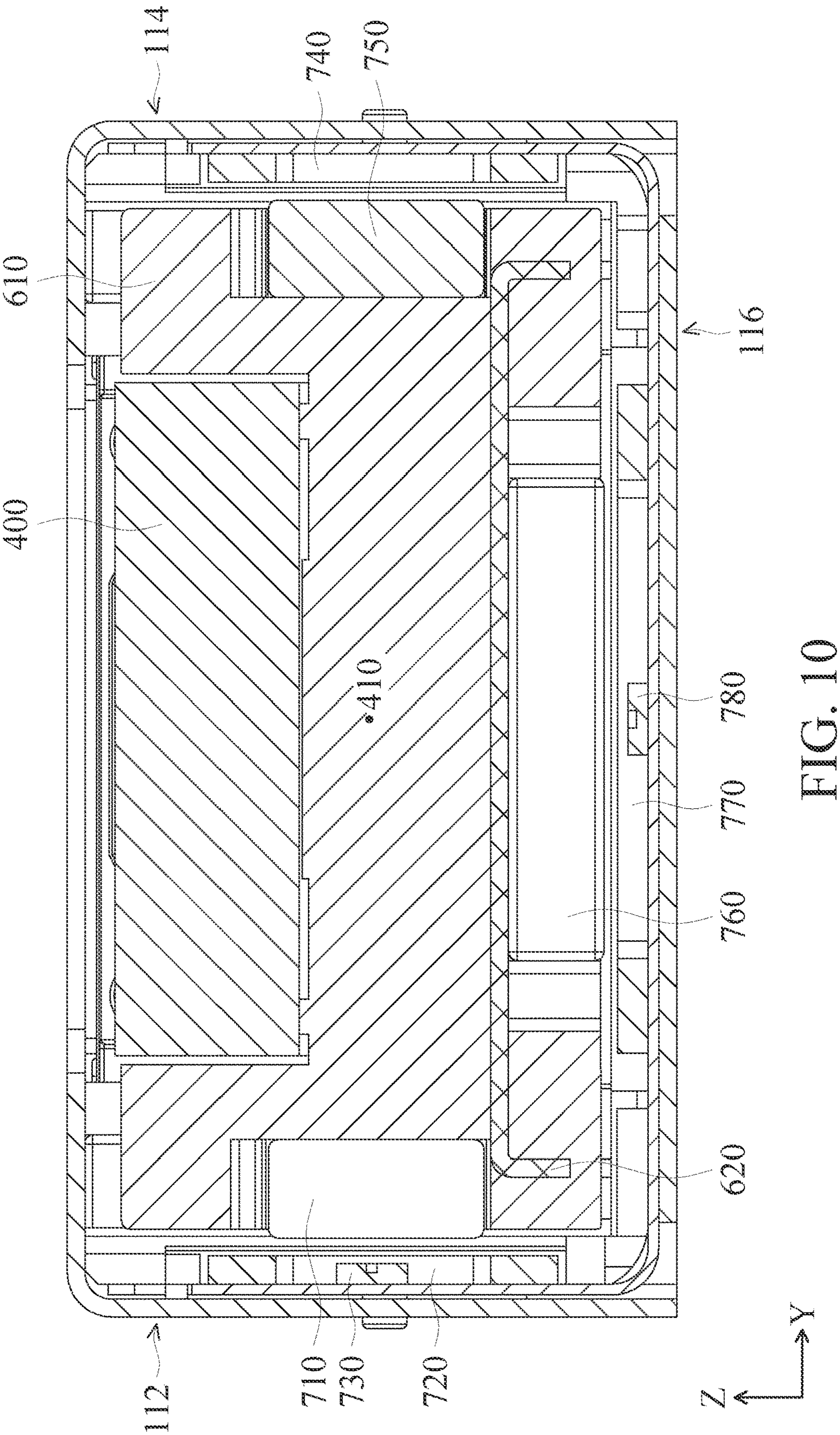
FIG. 10 is a cross-sectional view of the optical module of FIG. 1 along line B-B of FIG. 1 according to certain aspects of the present disclosure.

Please refer to FIG. 10. FIG. 10 is a cross-sectional view of the optical module 1 along the line B-B in FIG. 1, according to certain aspects of the present disclosure. When viewed along the first optical axis 410, the second magnetic element 710, the second coil 720, and the second sensing element 730 are located on the first side 112. The third magnetic element 740 and the third coil 750 are located on the second side 114. The fourth magnetic element 760, the fourth coil 770, and the third sensing element 780 are located on the third side 116. When viewed along the first optical axis 410, the second optical element 400 is located between the second magnetic element 710 and the third magnetic element 740. The first optical axis 410 is located between the second magnetic element 710 and the third magnetic element 740.

With the electromagnetic driving force generated between the second magnetic element 710 and the second coil 720, the second movable part 600 is driven to perform a first movement. The first movement is a rotational movement around an axis parallel to the first axis 190. Similarly, the second movable part 600 is driven to perform the first movement by the electromagnetic driving force generated between the third magnetic element 740 and the third coil 750. The second movable part 600 is driven to perform a second movement by the electromagnetic driving force generated between the fourth magnetic element 760 and the fourth coil 770. The second movement is a rotational movement around an axis parallel to the Y-axis. The second sensing element 730 is disposed at the central part of the second coil 720. The third sensing element 780 is disposed at the central part of the fourth coil 770. The second sensing element 730 and the third sensing element 780 may be used to sense the displacement/rotation of the second movable part 600 when moving, to achieve more accurate sensing.

Next, please refer to FIG. 11. FIG. 11 shows a front view of the first magnetic element 310 and the first coil 320 of the first driving assembly 300, and the second magnetic element 710 and the second coil 720 of the second driving assembly 700 of the optical module 1, according to certain aspects of the present disclosure. The first coil 320 has a first winding axis 322, and the second coil has a second winding axis 722. The maximum dimension d1 of the first coil 320 on the first winding axis 322 is different from the maximum dimension d2 of the second coil 720 on the second winding axis 722. The maximum dimension d1 of the first coil 320 on the first winding axis 322 is greater than the maximum dimension of the second coil 720 on the second winding axis 722. The maximum dimension d3 of the first magnetic element 310 on the first winding axis 322 is different from the maximum dimension d4 of the second magnetic element 710 on the second winding axis 722. The maximum dimension d3 of the first magnetic element 310 on the first winding axis 322 is smaller than the maximum dimension d4 of the second magnetic element 710 on the second winding axis 722. The ratio of the maximum dimension d3 of the first magnetic element 310 on the first winding axis 322 to the maximum dimension d1 of the first coil 320 on the first winding axis 322 is different from the ratio of the maximum dimension d4 of the second magnetic element 710 on the second winding axis 722 to the maximum dimension d2 of the second coil 720 on the second winding axis 722. The ratio of the maximum dimension d3 of the first magnetic element 310 on the first winding axis 322 to the maximum dimension d1 of the first coil 320 on the first winding axis 322 is smaller than the ratio of the maximum dimension d4 of the second magnetic element 710 on the second winding axis 722 to the maximum dimension d2 of the second coil 720 on the second winding axis 722.

Please refer to FIG. 3 again. The circuit board 180 is disposed between the first bottom 120, the second bottom 510, and the housing 110. The circuit board 180 has a first connecting part 182 and a second connecting part 184. The first connecting part 182 is located at the first side 112 (FIG. 4), the second connecting part 184 is located at the second side 114. The first connecting part 182 and the second connecting part 184 may extend out of the housing 110, and the first bottom 120 and the second bottom 510 are located between the first connecting part 182 and the second connecting part 184. The first connecting part 182 and the second connecting part 184 may protect the first bottom 120 and the second bottom 510 and other components (for example, a photosensitive module), and the first connecting part 182 and the second connecting part 184 may be electrically connected to an external module. Other components may be accommodated in the space between the first connecting part 182 and the second connecting part 184 to save space and achieve miniaturization of the mechanism.

Figure 12:
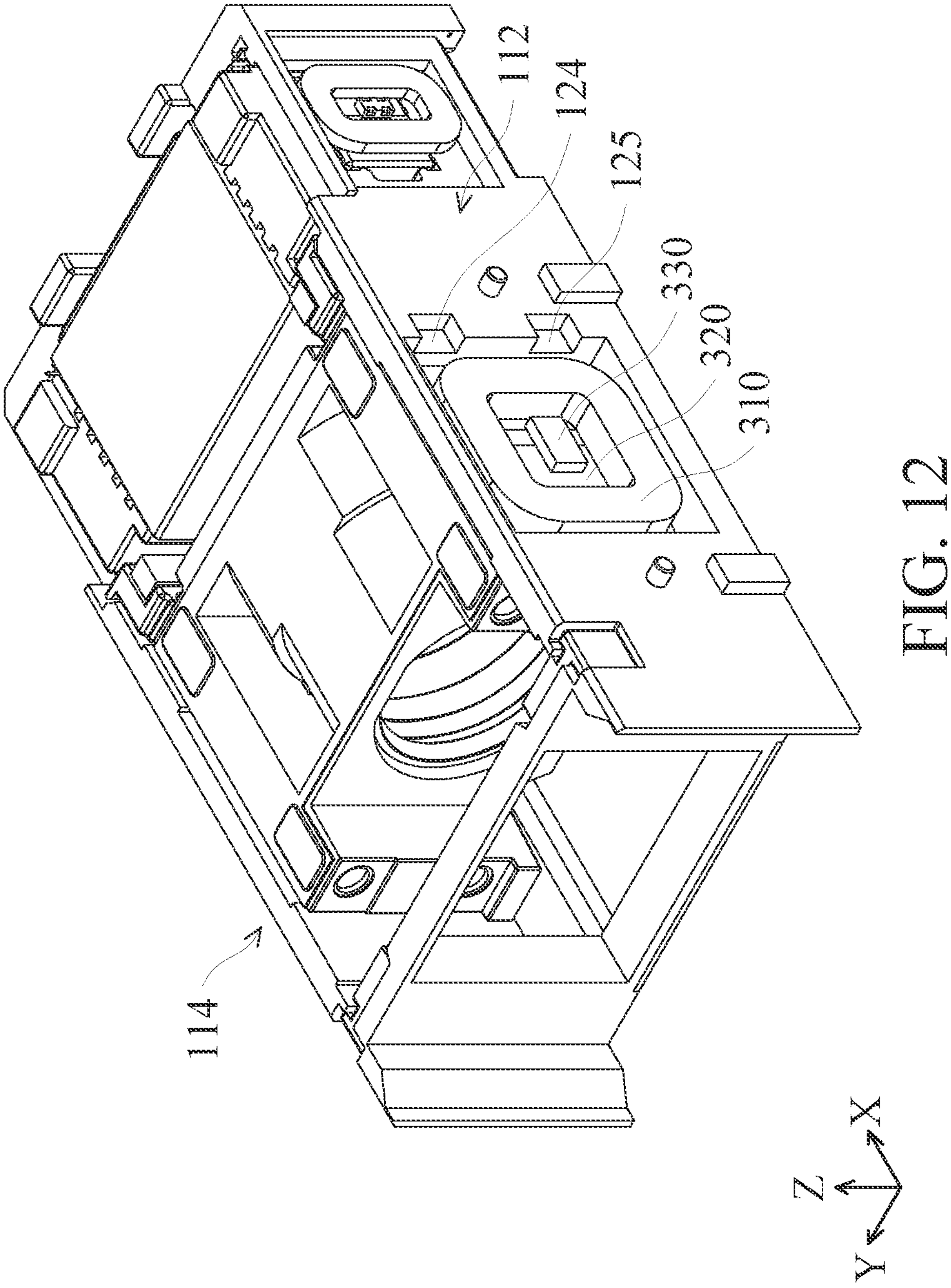
FIG. 12 is a rear perspective view of the optical module of FIG. 1 with the housing and the circuit board removed, according to certain aspects of the present disclosure.

Next, please refer to FIG. 12. FIG. 12 is a rear perspective view of the optical module 1 with the housing 110 and the circuit board 180 removed, according to certain aspects of the present disclosure. It can be seen in the FIG. 12 that the recesses 124, 125 of the first bottom 120 are located on the first side 112. The first coil 310 is welded to the circuit board 180 at the recesses 124, 125.

To sum up, the present disclosure provides an optical module that may achieve miniaturization, while the internal structure may absorb impact, reduce noise, reduce magnetic interference, and stabilize with magnetic attraction, so that when the position of the optical element is precisely adjusted, it may avoid tilting or deflecting.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical module, comprising:

a first fixed part, including a first bottom;

a first movable part for connecting a first optical element;

a first driving assembly for driving the first movable part to move relative to the first fixed part;

a second fixed part, including a second bottom;

a second movable part for connecting a second optical element; and a second driving assembly for driving the second movable part to move relative to the second fixed part; wherein the first fixed part and the second fixed part are fixedly connected to each other;

the first bottom and the second bottom have an integrally formed structure;

when viewed along a first optical axis of the first optical element, the first fixed part further includes a first side and a second side, and the first optical element is located between the first side and the second side;

when viewed along the first optical axis, the first fixed part has a polygonal structure;

when viewed along the first optical axis, the first side and the second side are parallel to each other;

when viewed along the first optical axis, the first driving assembly is located on the first side.

2. The optical module as claimed in claim 1, wherein:

the first driving assembly includes a first magnetic element and a first coil;

when viewed along the first optical axis, there is no active driving source for driving the first movable part on the second side;

when viewed along the first optical axis, the first fixed part further includes a third side that is not parallel to the first side; and when viewed along the first optical axis, the first side is shorter than the third side.

3. The optical module as claimed in claim 1, wherein the second driving assembly includes a second magnetic element, a second coil, a third magnetic element, and a third coil.

4. The optical module as claimed in claim 3, wherein:

when viewed along the first optical axis, the second magnetic element and the second coil are located on the first side;

the third magnetic element and the third coil are located on the second side;

when viewed along the first optical axis, the second optical element is located between the second magnetic element and the third magnetic element; and when viewed along the first optical axis, the first optical axis is located between the second magnetic element and the third magnetic element.

5. The optical module as claimed in claim 3, wherein:

the maximum dimension of the first coil on a first winding axis is different from the maximum dimension of the second coil on a second winding axis;

the maximum dimension of the first magnetic element on the first winding axis is different from the maximum dimension of the second magnetic element on the second winding axis; and the ratio of the maximum dimension of the first magnetic element on the first winding axis to the maximum dimension of the first coil on the first winding axis is different from the ratio of the maximum dimension of the second magnetic element on the second winding axis to the maximum dimension of the second coil on the second winding axis.

6. The optical module as claimed in claim 3, wherein:

the maximum dimension of the first coil on a first winding axis is greater than the maximum dimension of the second coil on a second winding axis;

the maximum dimension of the first magnetic element on the first winding axis is smaller than the maximum dimension of the second magnetic element on the second winding axis; and the ratio of the maximum dimension of the first magnetic element on the first winding axis to the maximum dimension of the first coil on the first winding axis is smaller than the ratio of the maximum dimension of the second magnetic element on the second winding axis to the maximum dimension of the second coil on the second winding axis.

7. The optical module as claimed in claim 1, wherein the first fixed part further includes a circuit board and a housing, and the circuit board is disposed between the first bottom, the second bottom and the housing.

8. The optical module as claimed in claim 7, wherein the circuit board has a first connection part and a second connection part, the first connection part is located on the first side, the second connection part is located on the second side, and the first connection part and the second connection part extend out of the housing.

9. The optical module as claimed in claim 8, wherein the first bottom further includes recesses located on the first side, and the first coil is welded to the circuit board at the recesses.

10. The optical module as claimed in claim 1, wherein the first movable part further includes a stabilizing assembly for applying a stabilizing force to the first movable part such that the first movable part bears against the first fixed part;

when viewed along a first axis, the stabilizing force deviates from the first optical axis;

the first axis is perpendicular to the first optical axis;

when viewed along the first optical axis, the first axis is parallel to the first side;

the direction of the stabilizing force is parallel to the first axis;

when viewed along the first axis, the stabilizing force deviates from a central axis of the first fixed part; and when viewed along the first axis, the central axis is parallel to the first optical axis, and the central axis passes through the center of the first fixed part.

11. The optical module as claimed in claim 10, wherein the stabilizing assembly includes:

a magnetically permeable element corresponding to the first magnetic element; and a stabilizing magnetic element, corresponding to the magnetically permeable element; wherein the first magnetic element is located between the magnetically permeable element and the first coil.

12. The optical module as claimed in claim 10, wherein:

when viewed along the first optical axis, the first bottom is located on the third side;

the first bottom further includes a first opening corresponding to the first movable part; and the first optical element at least partially overlaps the first opening when viewed along the first axis.

13. The optical module as claimed in claim 12, wherein the first fixed part further includes:

a first structural reinforcement element disposed in the first opening, wherein the first structural reinforcement element has a metal material and a magnetically permeable material; and a stray-light-preventing element disposed on the first bottom, wherein the stray-light-preventing element is disposed at the first opening.

14. The optical module as claimed in claim 13, wherein:

the first structural reinforcement element corresponds to the stabilizing magnetic element;

when viewed along the first axis, the stabilizing magnetic element at least partially overlaps the first structural reinforcement element; and the stabilizing magnetic element is movable relative to the first structural reinforcement element.

15. The optical module as claimed in claim 13, wherein:

when viewed along the first axis, the area of the stray-light-preventing element is different from the area of the first structural reinforcement element.

16. The optical module as claimed in claim 15, wherein:

when viewed along the first axis, the area of the stray-light-preventing element is smaller than the area of the first structural reinforcement element; and when viewed along the first axis, the stray-light-preventing element and the first opening do not completely overlap.

17. The optical module as claimed in claim 1, wherein the first fixed part further includes a plurality of stopper elements, including an elastic material;

the stopper elements are arranged on the first bottom; and the stopper elements at least partially cover the first bottom.

18. The optical module as claimed in claim 17, wherein the elastic material is rubber.

* * * * *